Inventor:
Antal Csicsatka,
by Norman C. Fulmer
His Attorney.

Nov. 1, 1966 A. CSICSATKA 3,283,074

VOICE-CONTROLLED COMMUNICATION SYSTEM

Filed Dec. 31, 1962 2 Sheets-Sheet 2

Inventor:
Antal Csicsatka,
by Norman C. Fulmer
His Attorney.

3,283,074
Patented Nov. 1, 1966

3,283,074

VOICE-CONTROLLED COMMUNICATION SYSTEM

Antal Csicsatka, Utica, N.Y., assignor to General Electric Company, a corporation of New York Filed Dec. 31, 1962, Ser. No. 248,704
7 Claims. (Cl. 179—1)

Figure 1:
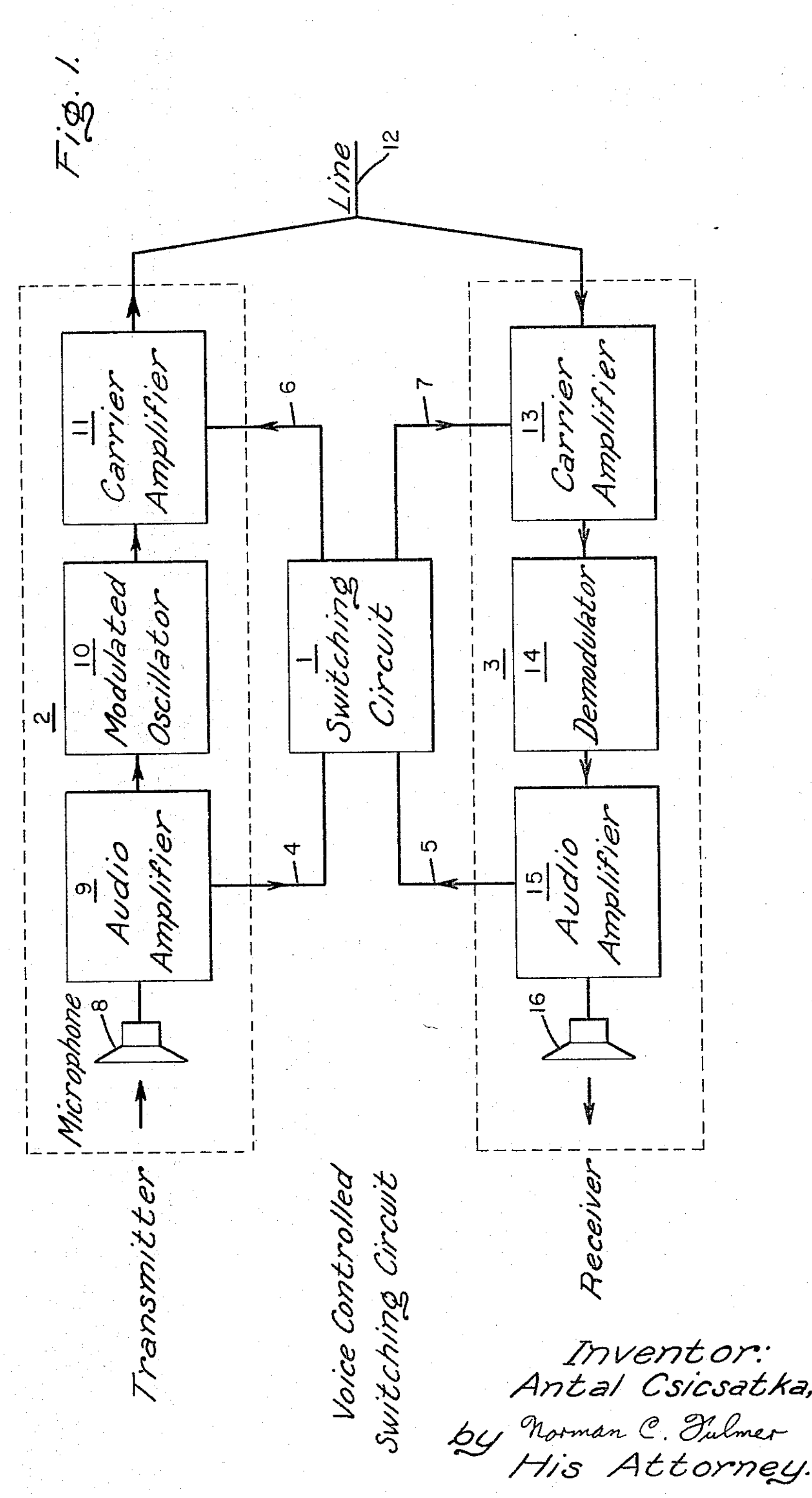

My invention relates to voice-controlled communication systems, and more particularly to signal-responsive electronic switching in such systems.

It is frequently desirable to provide a voice communication system having a plurality of remote stations, each operable to transmit information to associated stations in response to a voice, rather than requiring manual operation of controls at the station. By obviating manual operation of controls at the station, greater freedom is enjoyed in the selection of station mounting locations, since locations which are not readily accessible may be considered. Other advantages include allowing the operator to communicate while having the free use of both hands. A difficulty often encountered with voice-controlled communication systems is a tendency of the first portion of a spoken sentence to be omitted during the time required for the station transmitter to become fully operative. A further difficulty, which is often aggravated by an attempt to obtain a more rapid transmitter "turn-on" time, is that the transmitter will turn "off" between words, resulting in an annoying clicking or popping sound in the communicated message.

It is often desirable in voice-controlled communications systems to use a common means for propagating energy between the individual stations. The common means of propagation may be means for communicating in both directions, both for transmission and reception, on the same radio carrier frequency received and transmitted by a single antenna or communication line at each station. Other propagating mediums include a conductive path such as the domestic power lines. The use of a common means of propagation, with transmission and reception on the same frequency, allows greater simplicity of circuit design, requiring the use of less frequency sensitive circuitry, as well as allowing a less expensive interconnection of stations when special conductors are utilized for this purpose.

One problem arising from the use of a common means of propagation is associated with feedback of the received signal from the station speaker to the station transmitter microphone. Since the transmitter microphone is unable to distinguish the receiver speaker output from a voice originating in the vicinity of the station, it is possible for the station transmitter to become mistakenly operative in response to a received signal. If such an occurrence is allowed to enable operation of the transmitter, an oscillatory loop is formed which includes the station speaker and the station microphone as well as the connection to the common means of propagation. Oscillations increase rapidly in amplitude to produce a howl or screech, not unlike that associated with improper use of public-address amplifier systems. Unlike the public-address amplifier systems, however, the voice-controlled communication system utilizes sensitive receiver circuitry which might be destroyed when subjected to the full output energy of an adjacent transmitter. In addition, the desire for a fast response-time and low power consumption, during stand-by condition, frequently dictates that semiconductor-equipped stations be used, and such equipment, while enjoying an extremely long useful life during normal operation, is quickly destroyed when overloaded.

By my invention, I am able to provide a voice-controlled communication station which enjoys the economy attending use of a common means of propagation, while not subjecting the station to the hazards associated with simultaneous transmitter and receiver operation. The station can utilize the rugged and dependable semiconductor devices and exploit their rapid "switch-on" time to the fullest. In addition, my invention obviates annoying clicking and popping in the communicated message, caused by cycling of the transmitter between spoken words.

An object of my invention is to provide a voice-controlled communication station wherein the transmitter becomes enabled rapidly in response to a voice signal and becomes inhibited more slowly upon termination of a voice signal.

Another object of my invention is to provide an improved voice-controlled communication station with a signal-responsive electronic switch which precludes transmitter operation during reception of a signal.

Still another object of my invention is to provide an improved station, in a voice-controlled communication system, wherein the transmitter and receiver are operative only alternatively and not simultaneously.

These objects and others, which will be apparent as the nature of the invention is disclosed, are accomplished in one embodiment of the present invention by providing a communication station having a signal-responsive electronic switch. The switch is monostable, i.e. biased to favor one mode of conduction in the absence of controlling signals. In the favored mode of conduction, the station transmitter is inhibited, or prevented from operating, and the station receiver is enabled to perform its assigned function. An acoustic-electric transducer, which may take the form of a microphone, provides a source of modulating signal to the transmitter and additionally provides a signal to change the mode of conduction of the switch, thereby enabling the transmitter to function. The switch is rapidly responsive to the transducer output signal to almost instantaneously enable the transmitter. A time delay circuit is provided to delay the switch in returning to the favored mode of conduction wherein the transmitter is inhibited. This feature prevents rapid cycling of the transmitter, while allowing the desired fast "turn-on" time.

The switch is not responsive to the transducer output during reception of a signal. This is accomplished by a large over-riding control signal, derived from the receiver, which is supplied in series with the transducer output in a cancelling relationship. In addition, both the receiver and transmitter are enabled or inhibited in response to the mode of conduction of a single element in the switch output circuit. Both features, the over-riding control signal and the single switch element, combine to allow operation of the transmitter and receiver only alternatively.

Figure 2:
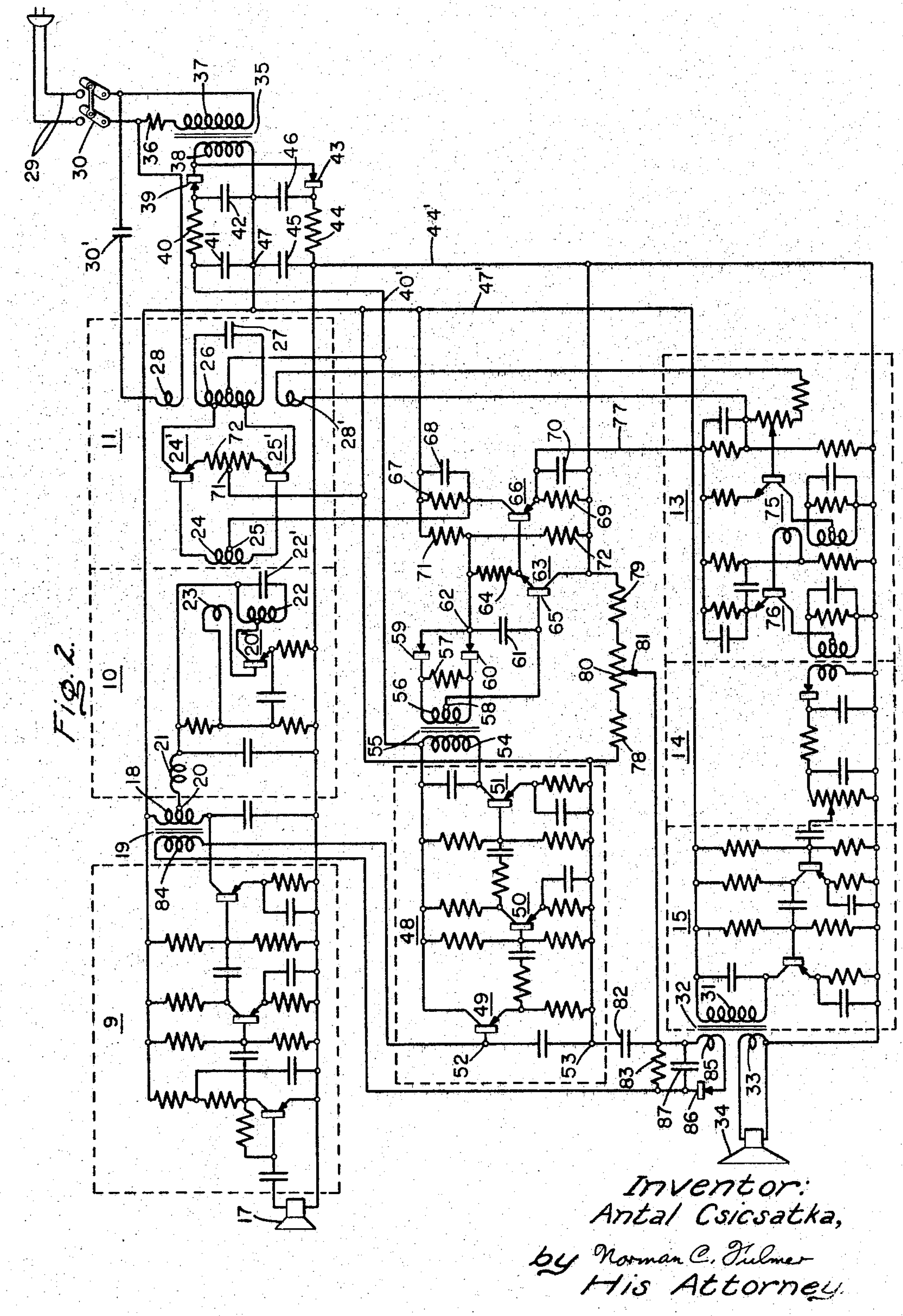

Although the novel features which are believed to be characteristic of this invention will be pointed out with particularity in the claims appended hereto, the invention, its objects and its advantages, the manner of its organization, and the mode of its operation will be better understood by referring to the following description taken in conjunction with the accompanying drawings forming a part thereof in which:

FIG. 1 is a block diagram showing the electrical interconnection of components in a communication station arranged in accordance with my invention; and FIG. 2 is a schematic diagram showing a specific embodiment of a communication station using my teaching.

The communication station of FIG. 1 is divided into three parts; electronic switch 1, transmitter 2 and receiver 3. Switch 1 is provided with two input signals, via lines 4 and 5, derived from transmitter 2 and receiver 3, respectively. The two input signals determine the mode of conduction of switch 1, which is responsive thereto to provide two output signals, one through line 6 to control transmitter 2 and the other through line 7 to control receiver 3.

Switch 1 is monostable and, in the absence of an input signal from lines 4 or 5, it seeks a mode of conduction to inhibit transmitter 2 and enable receiver 3. Thus the receiver is normally operative, and the transmitter inoperative.

Transmitter 2 includes an acoustic-electric transducer 8, which may be a microphone, for example, to provide an audio frequency electric signal corresponding to sound in the vicinity of the station. Audio amplifier 9 raises the power level of the audio frequency electric signal from transducer 8, to provide an adequate modulating signal to modulate the output of oscillator 10. Line 4, which supplies the transmitter input signal to switch 1, is connected to audio amplifier 9 to take advantage of some or all of the amplification available, as may be required to control switch 1. It is apparent that, if the transducer output is adequate to control switch 1, line 4 may be connected directly to transducer 8.

Modulated oscillator 10 generates a radio frequency voltage which is modulated in accordance with the electrical output of transducer 8, as amplified by audio amplifier 9. Carrier amplifier 11 raises the power level of the radio frequency voltage from oscillator 10 to provide adequate propagation to other stations via line 12. The transmitter control signal from switch 1, as conducted by line 6, is shown connected to carrier amplifier 11. Transmitter control could be equally well effected at any stage subsequent to the stage supplying the signal to line 4.

The receiver input carrier amplifier 13 is also connected to line 12, as is the transmitter output carrier amplifier 11. Receiver control line 7 from switch 1 is preferably connected to affect the first stage of carrier amplifier 13, to avoid leaving stages uncontrolled, and hence unprotected. When enabled, carrier amplifier 13 raises the power level of a signal received from line 12, and provides an input to demodulator 14. The audio information, extracted by demodulator 14, is amplified by audio amplifier 15 and provides the necessary electrical energy to drive electro-acoustic transducer 16, which may take the form of a conventional radio speaker. Switch input line 5 is energized in response to reception of a signal by receiver 3, and is shown extending from audio amplifier 15 to switching circuit 1. Any stage subsequent to the stage connected to line 7 may serve equally well as a source of signal for line 5, depending upon the input requirements of switch 1.

Operation of the voice-controlled communication station of FIG. 1, may be understood by first assuming that the station is in a quiescent state, i.e. signals are neither being transmitted nor received. It is apparent that in this state no input signals are applied through line 4 or 5 to switch 1. Switch 1 is monostable and in the quiescent state seeks the mode of conduction which provides an inhibiting signal through line 6 to transmitter 2 and an enabling signal through line 7 to receiver 3.

A voice in the vicinity of transducer 8 produces an audio frequency electrical output therefrom which is effective, through amplifier 9, to provide a signal through line 4 to switch 1. Switch 1 is responsive thereto rapidly to change the mode of conduction at its output, enabling transmitter 2 and inhibiting receiver 3. When the voice is no longer present, switch 1 returns to its quiescent mode of conduction after a short time, determined by a delay built into switch 1.

Reception of a signal by receiver 3 establishes a large over-riding signal which is conducted by input line 5 to switch 1. Such a signal from line 5 renders switch 1 unresponsive to any input signal which may occur through line 4. Thus, transmitter operation is precluded during reception of a signal, regardless of acoustical energy supplied from the receiver electro-acoustic transducer 16 to the transmitter acoustic-electric transducer 8.

FIG. 2 shows a specific embodiment of a voice-controlled communication station constructed in accordance with the teaching of my invention. The station is particularly well adapted for use with domestic power lines as the interconnection means between stations.

The station transmitter comprises a transmitter microphone 17 which supplies the input signal to a resistance-capacitance coupled, three-stage class A, audio amplifier 9. The output of audio amplifier 9 appears across winding 18 of audio transformer 19.

In order to provide a modulated radio frequency signal for transmission, a portion of the voltage appearing across winding 18 is derived from tap 20 and supplied, through radio frequency choke 21, to radio frequency oscillator 10. The oscillator comprises a transistor 20′ regeneratively connected by a radio frequency transformer having an oscillatory circuit comprising a collector winding 22 and capacitor 22′, and a regenerative feedback winding 23. An output winding 24 having a center tap 25 is coupled to windings 22 and 23.

The transmitter output stage includes tapped output winding 24 to obtain a balanced driving signal to carrier amplifier 11. The carrier amplifier 11 comprises transistors 24′ and 25′ connected in push-pull relationship between input winding 24 and output winding 26. These transistors operate in a class B mode when enabled by the electronic switching circuit. The amplifier also comprises a radio frequency output transformer having an output oscillatory circuit, including winding 26 and capacitor 27, which is tuned to the carrier frequency.

Secondary winding 28 inductively couples the transmitter output to domestic power lines 29, when double pole switch 30 is closed, and secondary winding 28′ provides the receiver input signal. A capacitor 30′ is interposed between the winding 28 and lines 29 and has a value of capacitance, for example 0.5 microfarads, to pass the radio frequency carrier but not to pass the 60 cycle power line frequency.

The receiver portion of the station shown in FIG. 2 comprises, carrier amplifier 13, which receives the carrier wave from winding 28′ both during transmission of signals by the transmitter and during reception of signals from remote stations over the power line. It is shown as a two-stage, transformer-coupled, class A transistor radio frequency amplifier. Amplifier 13 is provided to raise the level of an incoming signal to a magnitude suitable for demodulator 14. Demodulator 14 comprises a half-wave detector circuit which extracts the audio information from the incoming signal. The audio signal output from demodulator 14 is supplied to receiver audio amplifier 15, which may take the form of a conventional resistance-capacitance coupled, two-stage class A audio amplifier.

The output of receiver audio amplifier 15 appears across winding 31 of audio frequency transformer 32. Impedance-matching output winding 33 is in voltage-inducing relationship with winding 31, and supplies the received audio signal to receiver speaker 34.

The power supply for circuit energization is derived from domestic power lines 29 which supply energy, through double-pole switch 30, to stepdown transformer 35. Resistance 36 limits the current flow through winding 37 of transformer 35 and further more provides additional isolation of transformer 35 from radio frequency output winding 28.

Output winding 38, of transformer 35, supplies energy to two half-wave rectifier circuits of opposite polarity comprising, diode 39, resistance 40, and capacitors 41 and 42 for output voltage of one polarity, and diode 43, resistance 44 and capacitors 45 and 46 for output voltage of the other polarity. It is apparent from the drawing that a negative output will appear on conductor 40′ connected to the output side of resistance 40 and a positive voltage will appear on conductor 44′ connected to the output side of resistance 44, both with respect to conductor 47', which may be grounded. Such resistance-capacitance filtered, half-wave, direct current power supply circuits are well established in the art and, therefore, the circuit operation of the power supply will not be further discussed.

Proceeding, now, to a description of the signal-controlled switching circuit of FIG. 2; there is shown a high gain, resistance-capacitance coupled audio frequency transistor amplifier 48 which serves as an input circuit to the switch. The amplifier input is coupled to receive a control voltage from both the transmitter channel and receiver channel.

Three PNP transistors 49, 50 and 51 are shown with the respective collector electrodes having a negative power supply potential derived from conductor 40' and the respective emitter electrodes are returned through resistors to the grounded conductor 47' of the power supply. With this circuit arrangement, it is apparent that a positive signal appearing at base 52 of transistor 49, with respect to emitter return point 53, which is connected to ground conductor 47', will result in transistor 49 shutting "off" and supplying no signal through the amplifier to winding 54 of transformer 55.

Assuming base electrode 52 of transistor 49 to receive a negative signal, with respect to emitter return point 53, an amplified version of the signal will appear across winding 54 of transformer 55. Since the amplifier 48 is designed for large amplification, rather than for fidelity of response, even a slight negative signal provides maximum output in winding 54.

Winding 56 of transformer 55 has low impedance and is inductively coupled to winding 54 such that an alternating current pulse appears across resistance 57 for each negative excursion of the voltage at base electrode 52. The alternating current pulse across resistance 57 is supplied to a full-wave rectifier circuit comprising center tap 58 on winding 56, diodes 59 and 60, and storage capacitor 61. Diodes 59 and 60 are poled such that the voltage at point 62 is negative with respect to center tap 58 of winding 56, as shown on the drawing.

In order to provide a slow discharge time for capacitor 61, transistor 63 is connected to operate as an impedance-transforming emitter follower stage wherein the voltage occurring across emitter resistance 64 is essentially equivalent to the voltage occurring across capacitor 61. However, the impedance of the discharge path through base electrode 65 is many times greater than the value of resistance 64.

It should be specially noted that winding 56, in conjunction with resistance 57, provides a low impedance charging circuit for capacitor 61 such that the capacitor rapidly charges to a voltage level proportional to the signal appearing across winding 56. The discharge path for capacitor 61 includes the high impedance base circuit of transistor 63. Therefore a much longer time is required for capacitor 61 to discharge when there is no signal across winding 56. It is this differential time response, or delay in discharge of capacitor 61, which allows the transmitter to become rapidly operative in response to a voice received by microphone 17 and to become inoperative more slowly at the termination of such a voice input, as will later be more particularly explained.

The output circuit of the switch comprises a single transistor 66 having its base connected to the emitter of transistor 63, its collector connected through load resistance 67 to ground conductor 47', and its emitter connected through resistance 69 to the positive conductor 44'. Resistance 67 is shunted by associated radio frequency by-pass capacitor 68, and emitter load resistance 69 is shunted by its associated radio frequency by-pass capacitor 70.

In the absence of a signal across winding 56, transistor 66 is biased to be fully conductive at a level determined by the voltage at the junction of voltage-dividing resistances 71 and 72, which are connected in series between ground conductor 47' and positive conductor 44'. The junction of resistances 71 and 72 is connected to the base of transistor 66 through resistance 64.

Turning now to the control of the station transmitter as determined by the mode of conduction of transistor 66; it will be noted that conduction of transistor 66 provides a positive voltage across collector load resistance 67, with respect to midpoint 47 of the power supply. This voltage on resistance 67 is supplied to center tap 25 of winding 24 in the receiver carrier amplifier 11, thereby driving the base electrodes of transistors 24' and 25' positive with respect to ground. Transistors 24' and 25' are of the PNP type, therefore such a bias causes "cut-off" of the transistors and resultant inoperativeness, or inhibition, of amplifier 11. When transistor 66 becomes non-conductive there is no voltage drop across resistance 67, and hence transistors 24' and 25' are biased to operate in the conventional class B manner, thus enabling amplifier 11.

With regard to receiver control, it is apparent that conduction of transistor 66 provides a negative voltage at its emitter electrode, with respect to the positive conductor 44' of the power supply. Transistors 75 and 76, of radio frequency amplifier 13, are of the NPN type and have a collector return path to the positive side 44' of the power supply. Therefore a negative potential in the emitter return path, for transistors 75 and 76, provides a proper bias polarity for normal amplifier operation. Conductor 77 provides such a return path. Conversely, when transistor 66 becomes non-conductive, both the collector and emitter return paths for transistors 75 and 76 seek the same potential, resulting in radio frequency amplifier 13 becoming inhibited.

Turning, now, to the control voltages supplied to the input of the electronic switching circuit of FIG. 2; a resistance divider between conductors 47' and 44' of the power supply is shown as comprising resistances 78, 79 and 80, the latter having a variable tap 81. These resistances combine to provide, at tap 81 of resistance 80, a variable positive voltage with respect to the emitter return 53 for amplifier 48. Storage capacitor 82 minimizes transient changes in the potential derived from tap 81. The positive voltage from tap 81 is supplied through resistance 83 and winding 84, of transformer 19, to base 52 of transistor 49 to ensure cut-off of transistor 49, in the absence of a signal across winding 84. The positive voltage thus obtained determines the minimum threshold voltage which must be induced in winding 84 in order to overcome the back-bias so as to provide an alternating current signal with negative excursion to base 52 of transistor 49. When a voice signal of sufficient strength is received by transmitter microphone 17, and amplified by amplifier 9, the voltage induced in winding 84 overcomes the back-bias to provide the alternating current signal having negative excursion, needed to energize amplifier 48. Then high gain amplifier 48 provides an output to winding 56 of transformer 55 which rapidly enables the transmitter and inhibits the receiver, as previously described.

In order to prevent transmitter operation during reception, a portion of the receiver output is induced in winding 85 of transformer 32, rectified by diode 86 and stored in capacitor 87. The resulting direct current voltage appears across resistance 83 and is poled to aid the bias derived from tap 81 of resistance 80. The magnitude of the additional back-bias, over-riding bias, is sufficient to preclude the voltage induced in winding 84 from achieving a magnitude sufficient to overcome the bias. This over-riding bias, derived from the receiver, ensures that the transmitter will not become conductive during reception of a signal.

The operation of the circuit of FIG. 2, will now be explained. To prepare the station for operation tap 81 of resistance 80 is positioned to provide a back-bias to base 52 of transistor 49 through resistance 83 and winding 84. This back-bias or threshold voltage is of positive polarity and determines the magnitude of signal which must occur in winding 84 in order to provide an alternating current signal of negative excursion to base 52 of transistor 49.

Such an alternating current signal of negative excursion is followed rapidly by a change in the mode of conduction of transistor 66, turning it off, attended by inhibiting receiver operation and enabling transmitter operation.

Since the voltage induced in winding 84 is proportional to the acoustical energy received by microphone 17, as amplified in audio amplifier 9, the positive voltage setting of tap 81 determines the level of voice input to which the electronic switching circuit responds. In most uses and particularly in manufacturing areas, there is an ambient noise level to which it is desired that the electronic switching circuit be not responsive. The setting of tap 81 determines the lower noise level to which the electronic switching circuit, and consequently the entire voice-controlled operation, is not responsive.

Upon reception of a signal, the carrier received from winding 28′ is amplified by transistors 75 and 76, demodulated by detector 14 and the resulting audio signal is amplified by amplifier 15 and supplied through transformer 32 to loud-speaker 34. A portion of the audio signal output is induced in winding 85 of transformer 32, rectified by diode 86, and appears across resistance 83 as filtered by capacitor 87. The voltage appearing across resistance 83 is of such polarity as to add to the back-bias derived from tap 81 of resistance 80, resulting in a strong back-biasing of base 52 of transistor 49. This prevents operation of the switch circuit in response to an input to the transmitter channel.

The time-constant, of the circuit which develops the additional back-bias, is such that the additional voltage level is established prior to reception by microphone 17 of the output from speaker 34. Also, the magnitude of the additional back-biasing signal is proportional to the amplitude of the signal driving speaker 34. It is apparent that the input to microphone 17 will also be proportional to the amplitude of received signal supplied to speaker 34. This proportionality allows the turns ratio of transformer 19 to be selected such that the peak amplitude of negative excursion induced in winding 84 does not exceed the additional back-bias developed across resistance 83. The electronic switching circuit is thereby precluded from performing a switching operation caused by reception of a signal.

In practice, it has been found desirable to provide sufficient turns in winding 85 of transformer 32 such that even low levels of received signal quickly develop an additional back-bias, across resistance 83, which is of sufficient magnitude, in series with the threshold level set by adjustable tap 81, to prevent the voltage in winding 84 of transformer 19 from developing negative excursions relative to the potential at point 53, even though the signal induced in winding 84 is of the maximum amplitude permitted by power supply considerations.

Transmission of a signal is achieved, in the absence of a received signal, by merely providing a voice input to transmitter microphone 17 which is of sufficient magnitude above the ambient noise level to overcome the normal threshold voltage, thereby energizing the electronic switching circuit to enable the transmitter and inhibit the receiver. At the termination of a transmission, the back-bias derived from variable tap 81 will cause transistor 49 to cease conduction. Thereafter, at a time determined by the time-constant of the discharge path for capacitor 61, including base 65 of transistor 63 and resistance 64, transistor 66 will switch to a quiescent mode of conduction wherein the transmitter is inhibited and the receiver is enabled.

In the event that transistor 66 should fail in the open-circuit mode of conduction, the transmitter is enabled and the receiver inhibited. Also, ambient noise modulation derived from microphone 17 together with other stray signals such as thermal noise, provide a sufficient modulated signal to other stations in the system such that their respective additional back-bias voltages rise to a level sufficient to preclude transmission at the other stations. In practice, the electronic switching circuit of my invention has been constructed to respond to modulation levels as low as two percent. This serves to preclude the operation of more than one transmitter in the system and to thereby protect the associated receivers when a malfunction occurs at one station wherein the switching transistor fails in its open-circuit mode of conduction. If a station switching transistor fails in the short-circuit mode of conduction, its receiver remains operative and normal voice-controlled functioning of its associated transmitter is precluded, thereby eliminating the risk of simultaneous transmission and reception.

The foregoing has explained in detail the specific features of the electronic switching circuit of my invention, and more particularly has shown how I provide a voice-controlled, semiconductor-equipped, single-frequency carrier communication system having individual stations with a receiver and transmitter operative alternatively and not simultaneously. While I have shown my voice-controlled electronic switching circuit to be particularly well adapted for use with an intercommunication system utilizing a radio frequency carrier, it is apparent that the switching circuit will adapt with equal facility to transmitter and receiver switching requirements in other settings, such as in intercommunication systems wherein an audio signal itself is propagated by conductors as well as to control of individual transmitting and receiving stations not specifically associated with a particular system or network, for example. Various modifications and variations of my voice-controlled electronic switching circuit will suggest themselves to those skilled in the art, and may be used without departing from the scope of my invention.

What is claimed as new and desired to be secured by Letters Patent of the United States is:

1. A voice-controlled communication station comprising:

(a) an acoustic-electric transducer responsive to a voice to provide an audio frequency electrical signal;

(b) monostable electronic switch means connected to said acoustic-electric transducer and responsive to the audio frequency electrical signal therefrom to change from a first mode of conduction to a second mode of conduction;

(c) transmitter means connected to said switch means and responsive to the mode of conduction thereof to enable transmission only during said second mode of conduction; and (d) time delay means connected to said switch means to provide a delayed change from said second mode of conduction to said first mode of conduction in the absence of an audio frequency electrical signal from said acoustic-electric transducer, whereby said transmitter is enabled in response to voice at said transducer more quickly than inhibited in response to cessation of voice, the timing of said transmitter means and delay means being such that the transmitter remains enabled between words in normal voice transmissions.

2. A voice-controlled communication station comprising:

(a) an acoustic-electric transducer responsive to a voice to provide an audio frequency electrical signal;

(b) monostable electronic switch means connected to said acoustic-electric transducer and responsive to the audio frequency electrical signal therefrom to change from a first mode of conduction to a second mode of conduction;

(c) transmitter means connected to said switch means and responsive to the mode of conduction thereof to enable transmission only during said second mode of conduction;

(d) receiver means connected to said switch means and responsive to a signal received at said station to render said switch means unresponsive to the audio frequency electrical signal from said acoustic-electric transducer, whereby the output from said acoustic-electric transducer is prevented from enabling said transmitter during reception of a signal; and (e) time delay means connected to said switch means to provide a delayed change from said second mode of conduction to said first mode of conduction in the absence of an audio frequency electrical signal from said acoustic-electric transducer, whereby said transmitter is enabled in response to voice at said transducer more quickly than inhibited in response to cessation of voice, the timing of said transmitter means and delay means being such that the transmitter remains enabled between words in normal voice transmission.

3. A voice-controlled communication station comprising:

(a) an acoustic-electric transducer responsive to a voice to provide an audio frequency electrical signal;

(b) monostable electronic switch means connected to said acoustic-electric transducer and having a single active output element responsive to the audio frequency electrical signal from said transducer to change from a first mode of conduction to a second mode of conduction;

(c) receiver means connected to said element and responsive to the mode of conduction thereof to provide reception of a signal only during said first mode of conduction;

(d) transmitter means connected to said element and responsive to the mode of conduction thereof to provide a transmitter output signal only during said second mode of conduction, whereby said receiver and said transmitter are operative only alternatively; and (e) time delay means connected to said switch means to provide a delayed change of said device from said second mode of conduction to said first mode of conduction in the absence of an audio frequency electrical signal from said acoustic-electric transducer, whereby said transmitter is enabled in response to voice at said transducer more quickly than inhibited in response to cessation of voice, the timing of said transmitter means and delay means being such that the transmitter remains enabled between words in normal voice transmissions.

4. A voice-controlled communication station comprising:

(a) an acoustic-electric transducer responsive to a voice to provide an audio frequency electrical signal;

(b) monostable electronic switch means connected to said acoustic-electric transducer and having a single active output element responsive to the audio frequency electrical signal from said transducer to change from a first mode of conduction to a second mode of conduction;

(c) transmitter means connected to said element and responsive to the mode of conduction thereof to provide a transmitter output signal only during said second mode of conduction.

(d) receiver means connected to said switch means and responsive to a signal received at said station to render said switch means unresponsive to the audio frequency electrical signal from said acoustic-electric transducer, whereby the output from said acoustic-electric transducer is prevented from enabling said transmitter during reception of a signal; and (e) time delay means connected to said switch means to provide a delayed change of said device from said second mode of conduction to said first mode of conduction in the absence of an audio frequency electrical signal from said acoustic-electric transducer, whereby said transmitter is enabled in response to voice at said transducer more quickly than inhibited in response to cessation of voice, the timing of said transmitter means and delay means being such that the transmitter remains enabled between words in normal voice transmissions.

5. A voice-controlled communication station comprising:

(a) an acoustic-electric transducer responsive to a voice to provide an audio frequency electrical signal;

(b) monostable electronic switch means connected to said acoustic-electric transducer and responsive to the audio frequency electrical signal therefrom to change from a first mode of conduction to a second mode of conduction;

(c) transmitter means connected to said switch means and responsive to the mode of conduction thereof to enable transmission only during said second mode of conduction; and (d) receiver means connected to said switch means and responsive to a signal received at said station to render said switch means unresponsive to the audio frequency electrical signal from said acoustic-electric transducer, whereby the output from said acoustic-electric transducer is prevented from enabling said transmitter during reception of a signal.

6. A voice-controlled communication station comprising:

(a) an acoustic-electric transducer responsive to a voice to provide an audio frequency electrical signal;

(b) monostable electronic switch means connected to said acoustic-electric transducer and having a single active output element responsive to the audio frequency electrical signal from said transducer to change from a first mode of conduction to a second mode of conduction;

(c) transmitter means connected to said element and responsive to the mode of conduction thereof to provide a transmitter output signal only during said second mode of conduction; and (d) receiver means connected to said switch means and responsive to a signal received at said station to render said switch means unresponsive to the audio frequency electrical signal from said acoustic-electric transducer, whereby the output from said acoustic-electric transducer is prevented from enabling said transmitter during reception of a signal.

7. A voice-controlled communication station comprising:

(a) an acoustic-electric transducer responsive to a voice to provide an audio frequency electrical signal;

(b) monostable electronic switch means connected to said acoustic-electric transducer and having a single active output element responsive to the audio frequency electrical signal from said transducer to change from a first mode of conduction to a second mode of conduction;

(c) receiver means connected to said element and responsive to the mode of conduction thereof to provide reception of a signal only during said first mode of conduction; and (d) transmitter means connected to said element and responsive to the mode of conduction thereof to provide a transmitter output signal only during said second mode of conduction, whereby said receiver and said transmitter are operative only alternatively.

References Cited by the Examiner

UNITED STATES PATENTS 3,046,354 7/1962 Clemency ........... 179—81
3,136,864 6/1964 Cleary ............... 179—1

KATHLEEN H. CLAFFY, *Primary Examiner.*

ROBERT H. ROSE, *Examiner.*

R. MURRAY, *Assistant Examiner.*